United States Patent [19]

Sekido et al.

[11] Patent Number: 5,258,155
[45] Date of Patent: Nov. 2, 1993

[54] INJECTION-MOLDING OF METAL OR CERAMIC POWDERS

[75] Inventors: Masakatsu Sekido; Hironori Nakayama; Michio Nukaya, all of Shimizu; Yoshihisa Noro, Yokohama, all of Japan

[73] Assignee: Shimizu Shokuhin Kaisha, Ltd., Japan

[21] Appl. No.: 882,892

[22] Filed: May 14, 1992

[30] Foreign Application Priority Data

May 14, 1991 [JP] Japan .................. 3-136962

[51] Int. Cl.$^5$ ............. C04B 35/64; B29C 45/72
[52] U.S. Cl. ........................ 264/109; 264/63; 264/118; 264/328.2; 264/328.17; 419/36
[58] Field of Search ........... 264/63, 109, 328.2, 264/328.17, 118; 419/36

[56] References Cited

U.S. PATENT DOCUMENTS

| | | | |
|---|---|---|---|
| 4,624,812 | 11/1986 | Farrow et al. | 264/63 |
| 4,649,003 | 3/1987 | Hashimoto et al. | 264/63 |
| 4,734,237 | 3/1988 | Fanelli et al. | 264/122 |
| 4,783,297 | 11/1988 | Ito et al. | 264/63 |
| 5,047,182 | 9/1991 | Sundback et al. | 264/28 |

Primary Examiner—Mary Lynn Theisen

[57] ABSTRACT

Provided is an injection-molding method for forming into given finished parts by injection-molding raw materials of a metal or ceramic powder feed, in which steps of coating a release agent to the mold, degreasing and freeze solidification are dispensed with. In this method, a metal or ceramic powder feed is kneaded with an agar sol comprising water, which may have or have not been treated magnetically, agar powders having a gel strength of 2000 g/cm$^2$ at an least 2% concentration and sodium borate to form a clay form of sol-state plastic material, and this material is then put in a heat-retaining hopper of injection-molding equipment in which it is injection-molded. Alternatively, this clay form of plastic material is cooled for gelation and pelletization (to obtain finely granulated gels). The pellets are put in a hopper of injection-molding equipment in which it is formed while heated and melted. The elasticity and viscosity of an agar solution is much more improved by adding sodium borate to a sol-state agar solution.

2 Claims, No Drawings

INJECTION-MOLDING OF METAL OR CERAMIC POWDERS

BACKGROUND OF THE INVENTION

1. Field of the Invention

This invention relates to a method for forming an injection-molded piece of a given elaborate structure by injection-molding a metal or ceramic powder feed and processing the injection-molded piece into a precision component.

2. Prior Art

In recent years, precision components have been mass-produced by a molding technique, according to which a metal or ceramic powder feed is injection-molded into a piece having an elaborate, three-dimensional structure, sintering that injection-molded piece and finishing the thus sintered compact by highly accurate precision processings.

Applied to this molding technique is plastic injection-molding practically used so far in the art, in which metal or ceramic powders are heated and kneaded with an organic polymer plastics—usually referred to as a binder, a plasticizer, a surface active agent or diffuser to increase the mixing efficiency of the powder feed with the plastics and a fluidity improver, e.g., a wax, then granulated and finally injection-molded.

It is noted, however, the above-mentioned conventional technique has the following problems.

For the conventional injection-molding technique, a release agent must be coated on the mold used, as is the case with plastic molding. Although depending upon the type of release agent, however, the release agent used may have an adverse influence on the quality of post-molding sintered compacts or silver parts. Prior to being carried to the sintering step, the molded pieces or green parts must be cleared of the binder made up of plastics or, in a more proper term, degreased. Needed for degreasing are exclusive equipment, periods of time as long as about a few days and special technical means. If the binder, etc. are completely removed at the degreasing step, then the post-degreasing pieces or brown parts may deform or break down when carried into a sintering furnace; that is, a part of the binder, etc. must be left in them. However, the remaining binder, etc. may react with metal elements during sintering to form carbides, which may otherwise have an adverse influence on the quality of the silver parts.

As an alternative to the aforesaid injection-molding process, using sublimable substances for the binder, etc. has been proposed, but this involves a problem in connection with injection moldability. Freeze injection-molding has come to mind as well, but a freezing means must be taken along with a special means to remove moisture from the green parts without giving rise to their deformation. This freeze injection-molding is also subject to too much restriction to form three-dimensional green parts.

This invention has been accomplished with a view to providing a solution to the above-mentioned problems.

SUMMARY OF THE INVENTION

According to one aspect of this invention, there is provided an injection-molding method characterized in that a metal or ceramic powder feed is kneaded with an agar sol comprising water, which may have or have not been treated magnetically, agar powders having a gel strength of 2000 g/cm$^2$ at an at least 2% concentration and sodium borate to form a clay form of sol-state plastic material, and said material is then put in a heat-retainable hopper of injection-molding equipment in which it is injection-molded.

According to another aspect of this invention, there is provided an injection-molding method characterized in that a metal or ceramic powder feed is kneaded with an agar sol comprising water, which may have or have not been treated magnetically, agar powders having a gel strength of 2000 g/cm$^2$ at an at least 2% concentration and sodium borate to form a clay form of sol-state plastic material, which is in turn pelleted by cooling and gelation (to form finely granulated gels), and the resulting pellet is finally put in a hopper of injection-molding equipment, in which it is injection-molded while heated and melted.

Agar, i.e., a substance extracted from seaweed, is on the one hand converted into a sol-state, viscous liquid at 95°–100° C. in the presence of water and on the other hand subject to gelation—which results in volume reductions—when cooled to 35°–40° C. or below, giving an elastic solid substance. The gel, if subject to a pressure, releases water present in it and low-molecular components from its surface. Although varying depending upon how to extract and the type or combination of seaweeds, the resulting agar powders show a gel strength of a few hundred to 2000 g/cm$^2$ or higher at a concentration of 2% in water. Differential thermal analysis indicates that the agar powders can decompose at a relatively low temperature on the order of 270°–280° C. The gels are so easily air-dried at normal temperature that non-elastic, hard solids can be obtained.

This agar is mainly made up of a high-molecular substance (polymer) of polysaccharides and shows a spiral structure when dissolved in water, and undergoes a reversible sol-to-gel change due to a state change in hydrogen ionic bonds in the presence of water molecules. Sol viscosity or gel strength depends on the strength of this hydrogen ionic bonding. Thus, physical sol or gel properties vary depending on in what state the hydrogen ionic bonds of the water used are. There is also a large difference in physical sol or gel properties depending upon the types of additives dissolved in water.

In order to use the agar powders having such actions as mentioned above in place of the conventional plastic binder, they must have much higher viscosity and gel strength. In this invention, agar powders having much higher gel strength, magnetically treated water and sodium borate are selectively used. The reason for this is to obtain viscosity and gel strength equal or approximate to those of plastic binders. These physical properties well fit for binders have a great influence on injection moldability like dimensional stability of green parts and homogenity of components.

Water is present in the form of a polymer with hydrogen ionic bonds rather than in a monomolecular form of $H_2O$. Magnetically treated water is in the form of a polymer having hydrogen ionic bonds weaker than those of water that is not magnetically treated, and has more hands for hydrogen ionic bonds with respect to agar molecules, thus increasing in sol viscosity and gel strength.

Magnetically treated water, that is in the form of a polymer with weaker hydrogen ionic bonds, is also well "wettable (or compatible)" with respect to metal or ceramic powders granulated to the order of microns or submicrons.

When an agar sol is intensively kneaded with sodium borate or its solution, the boric acid ions serve as the nuclei of hydrogen ionic bonds, giving rise to extremely strong hydrogen ionic bonds.

For instance, an agar sol obtained by dissolving agar powders having a gel strength of 2000 g/cm$^2$ at a 2% concentration in magnetically treated water with the application of heat and well kneading the resulting agar solution with a 0.3% sodium borate shows a viscosity equal to or higher than that of conventional plastic binders, and have a gel strength as high as 16000 g/cm$^2$ as well.

The agar sol having such properties is well kneaded with metal or ceramic powders in a pressure type kneader generating an intensive torque with "wettability" so well enough that the agar sol can be deposited around the particles of the powder feed with the use of an extremely small amount of an emulsifier (surfactant) and, besides, the amount of the agar sol used can be reduced to the irreducible minimum of a demand.

The thus produced sol or pelleted gel of the powder feed is put in the hopper of injection-molding equipment, in which it is injection-molded. In this case, neither is it likely that only the agar sol is prematurely extruded from within the extruder screw of injection-molding equipment, nor is it likely that only the agar gel or moisture is screwed out of the parting face or air bent of the mold. In order to improve injection moldability, the injection-molded piece is dwelled after injection-molding. The sol, which still retains some flowability at the mold runner or gate, is transformed into a gel in the course of this dwelling step, because the periphery of the green part is cooled. Upon receiving pressure, the green part releases water from its periphery.

These phenomena, if occur, would make the green part non-homogeneous and deform it during the drying and sintering steps to the detriment of its dimensional accuracy.

It is here noted that when water flows through equipment with a built-in, magnetic-line-of-force producing permanent magnet in the direction normal to that magnetic line of force, it is placed under magnetic-line-of-force influences, giving magnetically treated water rich in such properties as wettability and cohesiveness (for instance, see Patent Application No. 122889/1990 Gazette).

For instance, when water is passed spirally through a cylindrical form of paramagnetic metal vessel—in which there are a stack of 10 barium ferrite magnets with spacers inserted between them, each having a magnetic force of 2700-3000 G—at a rate of 2-3 m/sec. In the direction at right angles with the magnetic force of line, it is excited by the following actions of the magnetic line of force:

(1) The bond strengths of the hydrogen ionic bonds among water molecules weaken, or the hydrogen ionic bonds break down partly.

(2) Reductions in the inter-ionic distances due to ion drifts result in an increase in the cation-to-anion interaction. And (3) The orientation of atomic nuclear spins in water molecules varies due to magnetic moment. Accordingly, the magnetically treated water has the following properties, as compared with water that is not magnetically treated:

(i) high crystallinity,
(ii) high wettability,
(iii) high permeability, and
(iv) high cohesiveness.

EXAMPLES

This invention will now be explained more specifically but not exclusively with reference to the following examples.

EXAMPLE 1

Three thousand (3000) g of stainless steel—SUS 316L—powders having a mean particle size of 0.14 μm are mixed with 6 g of an aggregate, 1 g of an emulsifier and 2 g of an anti-fungus agent for 3 hours in a ball mill to prepare a regulated metal powder feed.

Dissolved in 500 ml of magnetically treated water placed in a mixer of a pressure type kneader are 80 g of an agar powder feed having a gel strength of 2000 g/cm$^2$ at a 2% concentration over a period of 15 minutes, while they are heated at 96°-98° C. and the blades of the kneader are rotated. This agar solution is then kneaded with 15 ml of a 10% sodium borate solution for 10 minutes to make an agar sol.

The above-mentioned metal powder feed is added to this agar sol in proportions. After the total amount of the metal powder feed has been added to the agar solution, they are well kneaded together under pressure for further 30 minutes to prepare a metal sol.

This metal sol is placed in a pelletizer, in which it is extruded and cut into a finely granulated, pelleted form of gels.

These gels in a pelleted form are put in a hopper of an in-line screw type of injection-molding machine designed to operate at a heating temperature of 96° C., an injection pressure of 100 kgf/cm$^2$ and a mold temperature of 20° C. for a cooling time of 30 seconds, whereby an elastic green part complicated in structure is formed. In the course of injection molding, there is no need of coating a release agent on the inner face of the mold at all.

The green parts are lightly air-dried at normal temperature into non-elastic, hard green parts, which are arranged in a vacuum sintering furnace after their runner and gate portions have been removed by cutting. Bear in mind that these runner and gate portions can be crushed for recycling. With the in-furnace vacuum degree set at 10$^{-4}$ torr or below, a heat cycle comprising a 90-minute retention at up to 140° C., a 30-minute retention at 140° C., a 120-minute retention at 140° C. to 280° C., a 180-minute retention at 280° C. to 1350° C., a 60-minute retention at 1350° C. and cooling is applied to obtain a near net form of silver parts having a dimensional accuracy of ±0.3% or below. Each silver part has a relative density of 96-98% that is equivalent to that of ingot material. In some cases, the agar gel gathers mold and fungi during long-term storage in a pelleted state, resulting in agar decomposition and corrosion due to the action by these mold and fungi. Such a gel strength reduction due to corrosion is prevented by using the anti-fungus agent.

EXAMPLE 2

Added to 3300 g of stainless steel (SUS 430) powders having a mean particle size of 12.16 μm are 6.6 g of an aggregate, 1.1 g of an emulsifier and 2 g of an anti-fungus agent to prepare a regulated metal powder feed, as described in Example 1.

With 450 ml of magnetically treated water placed in a mixer of a pressure type kneader, an agar sol is made from 75 g of agar powders and 12 ml of a 10% sodium borate solution, as again described in Example 1.

The procedures from adding the metal powders to the agar sol to making silver parts follow Example 1.

Each silver part has a dimensional accuracy of ±0.3% or below and a relative density of 99–99.8%.

EFFECT OF THE INVENTION

As can be understood from what has been described at great length, this invention enables injection molding to be carried out at low temperature and pressure, because an agar sol binder comprising agar having a gel strength of 2000 g/cm$^2$, magnetically treated water and sodium borate is used in lieu of conventional plastic binders. This makes it possible to extend the service life of a costly mold and reduce heat energy costs. There is no need of coating a release agent to the mold as well. The greatest effect with using such an agar sol is to dispense with any degreasing step. Nor are a specific degreasing step—which must, in some cases, be carried out for as long as several days, exclusive equipment and technique needed. Where conventional plastic binders are used, the carbon in binder residues reacts with metal elements during degreasing or sintering to form carbides, posing some problems that silver parts degrade, etc. In particular, it is difficult to make precision components from low-carbon organic alloys by injection molding. Where the agar sol is used as a binder, however, the binder components are unlikely to react with metal elements to form carbides, because they decompose in vacuo at a temperature of 270°–280° C. or lower, even when the material is carried directly, i.e., not through a degreasing step, to the sintering step. Thus, high-quality silver parts can be attained.

What is claimed is:

1. An injection-molding method comprising:
    kneading ceramic or metal powders with an agar sol to form a sol-state material, said agar sol comprising water which has optionally been magnetically treated, agar powders having a gel strength of 2000 g/cm$^2$ at a concentration of at least 2%, and sodium borate; and
    injection molding said sol-state material.

2. An injection-molding method comprising:
    kneading ceramic or metal powders with an agar sol to form a sol-state material, said agar sol comprising water which has optionally been magnetically treated, agar powders having a gel strength of 2000 g/cm$^2$ at a concentration of at least 2%, and sodium borate;
    pelletizing said sol-state material to form finely granulated gels; and
    injection-molding said granulated gels.

* * * * *